United States Patent
Zhuang et al.

(10) Patent No.: US 10,838,995 B2
(45) Date of Patent: Nov. 17, 2020

(54) GENERATING DISTINCT ENTITY NAMES TO FACILITATE ENTITY DISAMBIGUATION

(71) Applicant: MICROSOFT CORPORATION, Redmond, WA (US)

(72) Inventors: Wei Zhuang, Sammamish, WA (US); Jingfeng Li, Issaquah, WA (US); Yan Ke, Redmond, WA (US); Hung-An Chang, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 706 days.

(21) Appl. No.: 14/280,317

(22) Filed: May 16, 2014

(65) Prior Publication Data

US 2015/0331950 A1 Nov. 19, 2015

(51) Int. Cl.
 *G06F 16/338* (2019.01)
 *G06F 16/9535* (2019.01)
 *G06F 16/2457* (2019.01)

(52) U.S. Cl.
 CPC ...... *G06F 16/338* (2019.01); *G06F 16/24575* (2019.01); *G06F 16/9535* (2019.01)

(58) Field of Classification Search
 CPC .......... G06F 17/30864; G06F 17/3089; G06F 17/30424; G06F 16/338; G06F 16/9535; G06F 16/24575
 USPC ........................................ 707/709, 748, 802
 See application file for complete search history.

(56) References Cited

U.S. PATENT DOCUMENTS

| | | | | |
|---|---|---|---|---|
| 6,018,738 A | * | 1/2000 | Breese | G06Q 30/06 706/11 |
| 7,792,837 B1 | * | 9/2010 | Zhao | G06F 16/313 707/738 |
| 8,364,692 B1 | * | 1/2013 | Allen | G06F 16/90344 707/758 |

(Continued)

FOREIGN PATENT DOCUMENTS

WO 0227542 A1 4/2002

OTHER PUBLICATIONS

Szarvas, et al., "Improving a State-of-the-art Named Entity Recognition System Using the World Wide Web", In Proceedings of 7th Industrial Conference on Advances in Data Mining: Theoretical Aspects and Applications, Oct. 28, 2007, 10 pages.

(Continued)

*Primary Examiner* — Pierre M Vital
*Assistant Examiner* — Nargis Sultana
(74) *Attorney, Agent, or Firm* — Shook, Hardy and Bacon, L.L.P.

(57) ABSTRACT

Computer-readable media, computer systems, and computing methods for facilitating generation of entity names for entities are provided. The method includes determining a set of previously submitted queries that are associated with an entity. The most frequently used query within the set of previously submitted queries associated with the entity can be identified and, thereafter, designated as the entity name for the entity. The entity name can distinguish the entity from other entities. Such an entity name can be provided for presentation to a user, for example, as a related search suggestion via a search results page.

20 Claims, 5 Drawing Sheets

(56) References Cited

U.S. PATENT DOCUMENTS

| | | | | |
|---|---|---|---|---|
| 8,402,032 | B1* | 3/2013 | Brunsman | G06F 16/951 707/748 |
| 8,589,399 | B1* | 11/2013 | Lee | G06F 16/313 707/737 |
| 8,688,688 | B1* | 4/2014 | Murphy | G06F 16/29 707/714 |
| 8,732,167 | B1* | 5/2014 | Srinivasaiah | G06F 16/29 707/730 |
| 8,775,439 | B1* | 7/2014 | Lasko | G06F 16/951 707/748 |
| 8,843,466 | B1* | 9/2014 | Zeiger | G06F 16/951 707/706 |
| 9,336,211 | B1* | 5/2016 | Bousquet | G06F 16/951 |
| 10,068,022 | B2* | 9/2018 | Pilpel | G06F 16/9024 |
| 2003/0208354 | A1* | 11/2003 | Lin | G06F 40/295 704/9 |
| 2005/0043940 | A1* | 2/2005 | Elder | G06F 16/24522 704/9 |
| 2007/0067285 | A1* | 3/2007 | Blume | G06Q 10/10 |
| 2007/0233656 | A1* | 10/2007 | Bunescu | G06F 40/295 |
| 2008/0010366 | A1* | 1/2008 | Duggan | H04L 41/0853 709/223 |
| 2008/0065623 | A1* | 3/2008 | Zeng | G06F 16/355 |
| 2008/0228406 | A1* | 9/2008 | Denning | G01N 33/569 702/19 |
| 2008/0228720 | A1* | 9/2008 | Mukherjee | G06F 16/3338 |
| 2009/0144609 | A1* | 6/2009 | Liang | G06F 40/10 715/230 |
| 2009/0313237 | A1* | 12/2009 | Agrawal | G06F 16/3322 |
| 2009/0319257 | A1* | 12/2009 | Blume | G06F 40/58 704/7 |
| 2009/0319515 | A1* | 12/2009 | Minton | G06F 16/215 |
| 2010/0076972 | A1* | 3/2010 | Baron | G06F 40/295 707/736 |
| 2010/0198837 | A1* | 8/2010 | Wu | G06F 16/24578 707/748 |
| 2010/0223292 | A1* | 9/2010 | Bhagwan | G06F 40/295 707/780 |
| 2010/0293179 | A1* | 11/2010 | Chaudhuri | G06F 16/951 707/759 |
| 2010/0299343 | A1* | 11/2010 | Ahari | G06F 16/337 707/759 |
| 2011/0106807 | A1* | 5/2011 | Srihari | G06F 16/288 707/739 |
| 2011/0119243 | A1* | 5/2011 | Diamond | G06F 16/9535 707/706 |
| 2011/0231347 | A1* | 9/2011 | Xu | G06F 16/951 706/12 |
| 2012/0059838 | A1* | 3/2012 | Berntson | G06F 16/951 707/759 |
| 2012/0117058 | A1* | 5/2012 | Rubinstein | G06F 16/951 707/723 |
| 2012/0265787 | A1* | 10/2012 | Hsu | G06F 16/3322 707/780 |
| 2013/0151538 | A1* | 6/2013 | Dmitriev | G06F 16/313 707/750 |
| 2013/0173604 | A1* | 7/2013 | Li | G06F 16/3346 707/723 |
| 2013/0173639 | A1* | 7/2013 | Chandra | G06F 16/951 707/754 |
| 2013/0191376 | A1* | 7/2013 | Zhiyanov | G06F 16/5838 707/723 |
| 2013/0246416 | A1* | 9/2013 | Burckart | G06F 16/9535 707/732 |
| 2013/0262499 | A1* | 10/2013 | Zhou | G06F 16/951 707/768 |
| 2014/0067816 | A1* | 3/2014 | Kanungo | G06F 16/3344 707/740 |
| 2014/0214840 | A1* | 7/2014 | Gupta | G06F 16/3322 707/738 |
| 2014/0358971 | A1* | 12/2014 | Aminzade | G06F 16/3322 707/780 |

OTHER PUBLICATIONS

Hoffart, Johannes, "Discovering and Disambiguating Named Entities in Text", In Proceedings of ACM SIGMOD International Conference on Management of Data, Jun. 22, 2013, 5 pages.

Ploch, Danuta, "Exploring Entity Relations for Named Entity Disambiguation", In Proceedings of 49th Annual Meeting of the Association for Computational Linguistics: Human Language Technologies, Jun. 19, 2011, 6 pages.

Sekine, et al., "A Decision Tree Method for Finding and Classifying Names in Japanese Texts", In Proceedings of 6th Workshop on Very Large Corpora, Aug. 15, 1998, 8 pages.

Ananthanarayanan, et al., "Rule based Synonyms for Entity Extraction from Noisy Text", In Proceedings of the 2nd Workshop on Analytics for Noisy Unstructured Text Data, Jul. 24, 2008, 8 pages.

Guo, et al., "Named Entity Recognition in Query", In Proceedings of 32nd Annual International ACM SIGIR Conference on Research and Development in Information Retrieval, Jul. 19, 2009, 8 pages.

* cited by examiner

GENERATING DISTINCT ENTITY NAMES TO FACILITATE ENTITY DISAMBIGUATION

BACKGROUND

Search systems commonly use entity names to identify or represent various entities. For example, entity names can be used to present query suggestions, related searches, or related interests associated with a user-entered query. In many cases, entity names corresponding with various entities can fully overlap with one another and yet be directed to very different subject matters or topics. By way of example only, taj mahal the architecture and taj mahal the musician can be represented by the same entity name of "taj mahal." Presenting an entity name (e.g., "taj mahal") associated with multiple entities or topics can be confusing and ambiguous to a user thereby reducing a user's search experience.

SUMMARY

This Summary is provided to introduce a selection of concepts in a simplified form that are further described below in the Detailed Description. This Summary is not intended to identify key features or essential features of the claimed subject matter, nor is it intended to be used in isolation as an aid in determining the scope of the claimed subject matter.

According to embodiments of the invention, distinct or unique entity names are generated to facilitate entity disambiguation. In this regard, entity names generated to identify a particular entity can be tailored to capture a more unique, human-readable name for each entity, which is particularly useful when multiple interpretations could be otherwise applicable. In embodiments, distinct entity names can be generated for both "head" entities having rich information associated therewith and "tail" entities having sparse information associated therewith. Such distinct entity names may improve user experience, for instance, with respect to search engine search results pages as users may more readily identify particular entities as interesting or uninteresting.

BRIEF DESCRIPTION OF THE DRAWINGS

Embodiments of the invention are described in detail below with reference to the attached drawing figures, wherein.

DETAILED DESCRIPTION

The subject matter of embodiments of the invention disclosed herein is described with specificity to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Search systems commonly use entity names to identify or represent various entities. For example, entity names can be used to present query suggestions, related searches, or related interests associated with a user-entered query. In many cases, entity names corresponding with various entities can fully overlap with one another and yet be directed to very different subject matters or topics. By way of example only, taj mahal the architecture and taj mahal the musician can be represented by the same entity name of "taj mahal." Presenting an entity name (e.g., "taj mahal") associated with multiple entities or topics can be confusing and ambiguous to a user thereby reducing a user's search experience.

Embodiments of the present invention are directed to generating distinct entity names to facilitate entity disambiguation. In this regard, entity names generated to identify a particular entity can be tailored to capture a more unique, human-readable name for each entity, which is particularly useful when multiple interpretations could be otherwise applicable. In embodiments, distinct entity names can be generated for both "head" entities having rich information associated therewith and "tail" entities having sparse information associated therewith. Such distinct entity names may improve user experience, for instance, with respect to search engine search results pages as users may more readily identify particular entities as interesting or uninteresting.

An entity name, as used herein, refers to a name or identifier that identifies or indicates an entity. An entity generally refers to a subject matter or topic. In this regard, an entity might be a person, place, thing, or other topic. In embodiments, an entity name representing an entity might be presented to a user via a search engine search results page. An entity name might be presented as or within a query suggestion, related search, or other potential item of interest to the user. A query suggestion, as used herein, refers to a query that is suggested to a user based on the query input, or partially input, by a user. Generally, a query suggestion is presented to a user as a user inputs a search query, for example, into a search box on a webpage (e.g., a search page). In embodiments, one or more query suggestions can be displayed to a user via a drop box descending from the search box or in any other position or placement within the webpage. A related search may refer to a search or query that is recommended to the user based on its relation to, for example, a query, or portion thereof, input by a user; one or more search results presented in association with an input query; a search result selected by a user in response to an input query; and/or the like. These are merely examples of entity names presented within a search engine search results page and are not intended to limit the scope of embodiments of the present invention. Further, entity names can be presented in any number of environments and are not intended to be limited to presentation within search engine search results pages.

In additional or alternative embodiments, an entity name may be used as a query or requery to a search engine irrespective of whether the entity name is presented to a user. For example, assume that a user selects related search option titled "taj mahal." In such a case, although "taj mahal" is selected by a user, a query or requery issued to the search engine may be automatically modified (e.g., by a search engine, browser, etc.) to an entity name of "taj mahal the musician" to present a more specific query to the search engine.

The term "query" refers to any type of request containing one or more search terms (e.g., words, acronyms, etc.) that can be submitted to a search engine (or multiple search engines) for identifying search results based on the search term(s) contained in the query. An input query refers to any portion of a query that has been input into a search box by a user. For example, a portion of a user query may include any number of characters and/or terms, such as the query "taj" being a portion for the query for "taj mahal." A requery may be a query that is submitted to the search engine upon an initial query being issued to the search engine. For example, a user selection of a suggested query may be issued as a requery to the search engine. A query may include any number of characters and/or terms, whether complete or incomplete, such as a user query including two terms and a portion of a third term.

In accordance with various aspects of the invention, one embodiment of the invention described herein includes computer-readable media having computer-executable instructions for performing a method of facilitating generation of unique entity names. The method of this embodiment includes determining a set of previously submitted queries that are associated with an entity. The method also includes identifying the most frequently used query within the set of previously submitted queries associated with the entity. The method further includes designating the most frequently used query as an entity name for the entity, the entity name uniquely identifying the entity from other entities.

In a second illustrative embodiment, a method for facilitating generation of unique entity names is provided. The method includes recognizing an indication to generate an entity name for an entity. The method further includes determining whether the entity is associated with at least a threshold number of queries. When the entity is associated with at least the threshold number of queries, a first entity-name generating approach is used to generate an entity name for the entity. When the entity is not associated with the at least the threshold number of queries, a second entity-name generating approach is used to generate the entity name for the entity.

In a third illustrative embodiment, computer-executable instructions cause a computing device to perform a method of facilitating generation of entity names. The method includes generating a plurality of candidate entity names for an entity using a plurality of entity-name generating techniques; selecting a most unique human-readable entity name for the entity from among the plurality of candidate entity names, wherein the selection is based at least in part on the entity-name generating techniques used to generate the corresponding candidate entity names; and providing the selected entity name for presentation via a search results page to unambiguously represent the entity.

Figure 1:
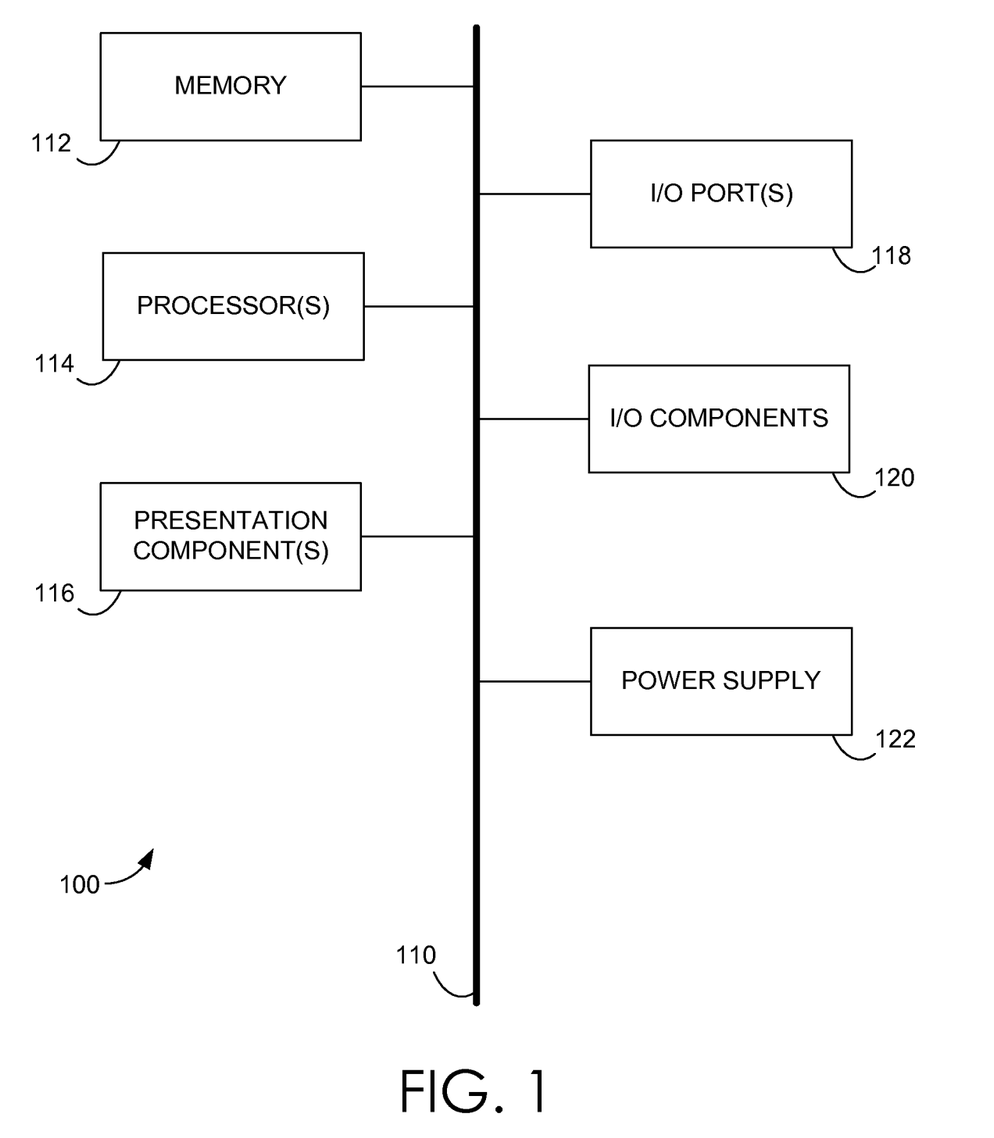
FIG. 1 is a block diagram of an exemplary computing device suitable for implementing embodiments of the invention.

Having briefly described an overview of some embodiments of the present invention, an exemplary operating environment in which embodiments of the present invention may be implemented is described below in order to provide a general context for various aspects of the present invention. Referring initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 1, computing device 100 includes a bus 110 that directly or indirectly couples the following devices: memory 112, one or more processors 114, one or more presentation components 116, input/output (I/O) ports 118, input/output components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 100. Computer storage media does not consist of signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 112 includes computer-storage media in the form of volatile and/or nonvolatile memory. The memory may be removable, non-removable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc.

I/O ports 118 allow computing device 100 to be logically coupled to other devices including I/O components 120, some of which may be built in. Illustrative components include a microphone, joystick, game pad, satellite dish, scanner, printer, wireless device, etc. The I/O components 120 may provide a natural user interface (NUI) that processes air gestures, voice, or other physiological inputs generated by a user. In some instance, inputs may be transmitted to an appropriate network element for further processing. A NUI may implement any combination of speech recognition, touch and stylus recognition, facial recognition, biometric recognition, gesture recognition both on screen and adjacent to the screen, air gestures, head and eye tracking, and touch recognition associated with displays on the computing device 100. The computing device 100 may be equipped with depth cameras, such as, stereoscopic camera systems, infrared camera systems, RGB camera systems, and combinations of these for gesture detection and recognition. Additionally, the computing device 100 may be equipped with accelerometers or gyroscopes that enable detection of motion. The output of the accelerometers or gyroscopes may be provided to the display of the computing device 100 to render immersive augmented reality or virtual reality.

Figure 2:
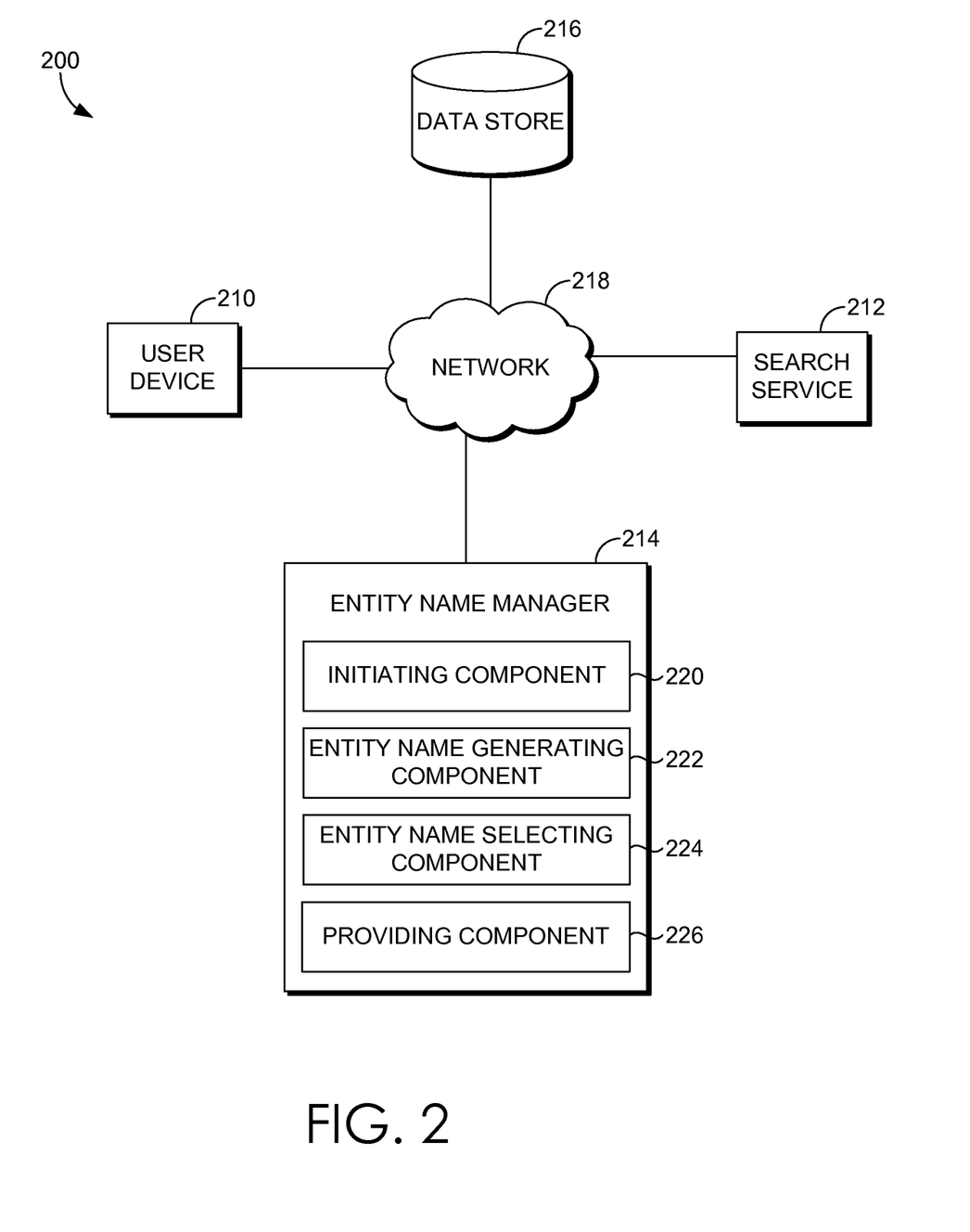
FIG. 2 is a block diagram of an exemplary network environment suitable for use in implementing embodiments of the invention.

Turning now to FIG. 2, a block diagram of an exemplary network environment 200 suitable for use in implementing embodiments of the invention is shown. The network environment 200 includes a user device 210, a search service 212, an entity name manager 214, and a data store 216. The user device 210, the search service 212, the entity name manager 214, and the data store 216 can communicate through a network 218, which may include any number of networks such as, for example, a local area network (LAN), a wide area network (WAN), the Internet, a cellular network, a peer-to-peer (P2P) network, a mobile network, or a combination of networks. The network environment 200 shown in FIG. 2 is an example of one suitable network environment and is not intended to suggest any limitation as to the scope of use or functionality of embodiments of the inventions disclosed throughout this document. Neither should the exemplary network environment 200 be interpreted as having any dependency or requirement related to any single component or combination of components illustrated therein. For example, the user device 210 may be in communication with the entity name manager 214 via a mobile network or the Internet, and the entity name manager 214 may be in communication with data source 216 via a local area network. Further, although the environment 200 is illustrated with a network, one or more of the components may directly communicate with one another, for example, via HDMI (high-definition multimedia interface), DVI (digital visual interface), etc. Alternatively, one or more components may be integrated with one another, for example, at least a portion of the entity name manager 214 may be integrated with the search service 212.

The user device 210 can be any kind of computing device capable of presenting or utilizing entity names. In embodiments, entity names may be presented via a search engine search results page. In this regard, the user device 210 might allow a user to submit a search query, for example, to the entity name manager 214 and to receive, in response to the input query, one or more query suggestions. For example, in an embodiment, the user device 210 can be a computing device such as computing device 100, as described above with reference to FIG. 1. In embodiments, the user device 210 can be a personal computer (PC), a laptop computer, a workstation, a mobile computing device, a PDA, a cell phone, or the like.

In an embodiment, the user device 210 is separate and distinct from the search service 212, the entity name manager 214 and/or the data store 216 illustrated in FIG. 2. In another embodiment, the user device 210 is integrated with one or more illustrated components. For clarity of explanation, we will describe embodiments in which the user device 210, the search service 212, the entity name manager 214, and the data store 216 are separate, while understanding that this may not be the case in various configurations contemplated within the present invention.

The data store 216 of FIG. 2 is configured to store various types of information used by the user device 210, the search service 212, and/or the entity name manager 214. In embodiments, the entity name manager 214 provides entity names to the data store 216 for storage, which may be retrieved or referenced by the search service 212. Additional or alternative types of information stored in data store 216 may include, for example, queries that have been previously issued or submitted to a search engine or server. In embodiments, at least a portion of the queries may be stored in a query log, histogram, or corpus such that the query log may be accessed to identify previously submitted queries. Information stored in data store 216 may be used to determine entity names. For example, entity name manager 214 may determine entity names based on information stored in data store 216, including, for example, query logs, entity features, query terms, rules, etc., as described more fully below.

With continued reference to FIG. 2, the user device 210 communicates with the search service 212 to facilitate a search for content. In embodiments, for example, a user utilizes the user device 210 to search for content available via the network 218. For instance, in some embodiments, the network 218 might be the Internet, and the user device 210 interacts with the search service 212 to obtain relevant search results and/or entity name identifiers. In other embodiments, for example, the network 218 might be an enterprise network associated with a company. In these embodiments, the user device 210 interacts with the search service 212 to search for content stored on various nodes within the enterprise network. It should be apparent to those having skill in the relevant arts that any number of other implementation scenarios may be possible as well.

The search service 212 provides searching services. In embodiments, the search service 212 provides searching services by searching for content in an environment in which content can be stored such as, for example, the Internet, a local area network (LAN), a wide area network (WAN), a database, a computer, or the like. The search service 212, according to embodiments, can be implemented as server systems, program modules, virtual machines, components of a server or servers, networks, and the like.

In embodiments, the search service 212 receives search queries, i.e., search requests, submitted by a user via the user device 210 and/or submitted by the entity name manager 214. Search queries received from a user can include search queries that were manually or verbally input by the user (input queries), queries that were suggested to the user and selected by the user (requeries), and any other search queries received by the search service 212. Additionally or alternatively, the search service 212 can receive search queries originating from the entity name manager 214, or a portion thereof. For instance, the entity name manager 214 can provide search queries or requests in response to user input or selection of a query. Generally, the search service 212 can receive search queries from any number of people, locations, organizations, and devices.

The search service 212 may be or include, for example, a search engine, a crawler, or the like. The search service 212, in some embodiments, is configured to perform a search using a query submitted through the user device 210, the entity name manager 214, or another component. In an embodiment, the search service 212 is configured to receive a submitted query (e.g., via the user device 210 and/or the entity name manager 214) and to use the query to perform a search. In an embodiment, upon identifying search results and/or entity names that satisfy or correspond with the search query, the search service 212 returns a set of one or more search results and/or entity names to the user device 410 and/or the entity name manager 214. Such search results and/or entity names may be displayed by way of a graphical interface. In another embodiment, the search service 212 can receive a query (e.g., requery) in the form of an entity name. For example, assume that a related search suggestion is provided to a user in response to an initial search query entered by a user. Further assume that the user selects the related search suggestion as a requery. In such a case, the requery might be an entity name provided to the search service 212 to provide relevant search results.

As can be appreciated, the search service 212 may communicate with the entity name manager 214 or data store 216 to integrate entity names in association with a search results page. In this regard, the search service 212 may communicate with the entity name manager 214 or data store 216 to incorporate entity names in connection with a search results page. In yet another embodiment, another component, such as the user device 210, may receive data from the search service 212 and/or the entity name manager 214 and, thereafter, integrate entity names in association with a search results page.

The entity name manager 214 generates and provides entity names. In embodiments, the entity name manager 214 includes an initiating component 220, an entity name generating component 222, an entity name selecting component 224, and a providing component 226. According to embodiments of the invention, the entity name manager 214 can include any number of other components not illustrated. In some embodiments, one or more of the illustrated components 220, 222, 224, and 226 can be integrated into a single component or can be divided into a number of different components. Components 220, 222, 224, and 226 can be implemented on any number of machines and can be integrated, as desired, with any number of other functionalities or services.

The initiating component 220 is generally configured to recognize an indication to generate entity names for entities and/or initiate generation thereof. An indication to generate an entity name(s) may be received or recognized in any manner. In some embodiments, an indication to generate an entity name for an entity may be recognized in accordance with issuance or submission of a search query. In this regard, when a search query is received, generation of an entity name(s) might be initiated. In other embodiments, an indication to generate entity names for entities may be automatically determined, for example, periodically, randomly, or based on an occurrence of an event. For example, generating entity names might be initiated in accordance with adding or updating entities in a data store, such as data store 216.

The entity name generating component 222 is generally configured to generate entity names, such as unique or distinct entity names. In this regard, the entity name generating component 222 can generate entity names that are readily identifiable and distinguishable from one another. As described herein, entity names can be generated in any number of ways. Several techniques described herein include utilization of a query log basis, a rule basis, a decision tree basis, a descriptor basis, and an entity relation basis. Any number of such techniques may be employed to generate entity names for an entity. By way of example only, both a query log basis and a rule basis may be used to generate entity names for an entity. As another example, both a query log basis and a rule basis may be combined to generate a single entity name for an entity. Further, in some embodiments, the particular name generating technique(s) to use may vary from entity to entity. To this end, the particular name generating technique to utilize for a particular entity may be selected in any number of manners, some of which are described more fully below.

The query log basis for generating an entity name is based on previously submitted queries associated with the entity. Generally, with the query log basis, a common or frequently used query for a specific entity can be selected as an entity name. In this manner, identification of a more common and/or unique query that leads to an entity may be sought to use as the entity name. As such, the entity name generating component 222 may determine or identify a set of one or more queries, or portions thereof, that are associated with or directed to an entity. From the set of queries, one or more queries, or portions thereof, can be selected based on frequency of use, as described in more detail below.

To determine queries directed to or associated with a specific entity, in embodiments, a query log(s) may be used. A query log may include various types of information such as, for instance, queries submitted, search results or URLs selected in response to queries, or the like. As can be appreciated, any number of query logs or aggregate query logs may be analyzed to determine queries specific to an entity. In some embodiments, query logs associated with an entity are aggregated. For example, the entity name generating component 222 might access an aggregated query log containing multiple query logs from the data store 216 or might access multiple query logs from the data store 216 and, thereafter, aggregate the query logs. As can be appreciated, the analyzed query log(s) might be a query log(s) associated with a particular individual, a set of individuals, or a global set of individuals.

A query log(s) may be analyzed to identify search results or URLs selected by a user after a query is issued. Search results, URLs, or web documents resulting from selection of thereof can be associated with an entity. Such an association may be determined and stored, for example, in data store 216. When a search result, URL, or corresponding web document selected by a user in response to a query is associated with an entity, the corresponding query can be associated with the entity. By way of example, assume that a user issues the query "sims2" and, thereafter, clicks on a search result associated with a web document that is directed to the video game. Further assume that the selected web document is associated with the entity of the "The Sims 2." As a result of the content of the web document being associated with the entity, the query of "sims2" can be determined to be associated with or directed to the entity of "The Sims 2." In this regard, the query of "sims2" is deemed to be associated with the entity of "The Sims 2" video game and not lead to other entities. To the extent that a query leads only to a single entity, then such a query may be a potential entity name for the entity.

Upon associating a set of one or more queries with an entity, with query log basis, a commonly or frequently used query(s) can be selected to be an entity name. The set of queries determined to be associated with the entity can be analyzed to identify frequent use of a query, or portion thereof. In this regard, the entity name generating component 222 might identify the frequent query or query terms used to indicate a unique entity. A frequency threshold may be used to determine when a query is frequently used in association with an entity. Such a frequency threshold may be any threshold that, when exceeded, indicates a query, or portion thereof, used frequently in association with the entity. In other cases, a predetermined number (e.g., one) of the greatest utilized query(s) can be selected. By way of example only, for the video game "The Sims 2," the most frequent query input by users may be identified as "sims2" based on analysis of the query logs.

As can be appreciated, any number of queries, or portions thereof, may be identified as an entity name for an entity. For example, in some embodiments, only a single, most frequently used query associated with an entity may be selected as an entity name. In other embodiments, any query that exceeds a frequency threshold may be selected as an entity name for the entity.

Turning to the rule basis approach for generating entity names, the rule basis utilizes an appropriate rule to determine an entity name for an entity. Rules can be automatically or manually generated and may be of any format. Query logs may be used to generate rules. In some embodiments, a rule to apply to determine an entity name for an entity might be based on the particular type of entity. A type of entity may refer to a particular category of entities. For example, an entity type may be a person, an organization, an athlete, a movie, an event, a sports event, an entertainment event, a location, a consumer product, or the like. As such, upon identifying an entity type of an entity, a particular rule can be applied to identify a potential entity name. As such, application of a rule basis may be used when an entity type, domain knowledge, or segment exists for which a certain descriptor of an entity is known or deemed to lead to favorable results.

By way of example only, assume that the movie titled the "Fast & Furious 6," which was released in 2013, is an entity for which an entity name is to be generated. Further assume that the entity is recognized as a movie entity type. As such, a rule specific to a movie entity type may be referenced and used to determine an entity name. For instance, a rule or pattern that includes the movie title and release year may result in an entity name of "fast and furious 2013.

The decision tree basis utilizes a decision tree(s) to determine an entity name for an entity. Generally, when two or more entities share a same or similar name, a decision tree can be traversed to identify data that distinguishes the entities. Using a decision tree analysis to identify distance between entities enables more unique entity names. A decision tree can be made up of various levels, nodes, or features related to entities. A decision tree can be generated at any time and in any manner. For example, a decision tree might be generated in accordance with features existing and available via a webpage. For instance, in association with a people directory (e.g., whitepages.com or linkedin.com), features associated with individuals or organizations might be extracted and included in a decision tree. Such features can enable differentiating entities from one another.

One exemplary hierarchy structure of a decision tree for working professionals may include a top level including an employer feature, an address feature, and an educational institute feature. The employer feature may include multiple levels of features including, for example, job title and city. The address feature may include multiple levels including state, city, and street address. The educational institute may also include multiple levels including degree and city.

By way of example only, assume that a first entity of John Doe 1 and a second entity John Doe 2 are both referred to as "John Doe." Now assume a decision tree is traversed with respect to their employment and it is identified that both individuals are employed at the same company in the same city thereby not providing any distinguishment between the two entities. In such a case, another level of features related to the individuals' addresses can be traversed to identify unique data. In this regard, it may be identified that although the two individuals live in the same state, their home residences are in different cities. In such a case, an entity name for the first entity John Doe 1 may be determined to be "John Doe, Seattle," while an entity name for the second entity John Doe 2 may be determined to be "John Doe, Bellevue."

As can be appreciated, a particular decision tree to traverse might be selected based on the entity type. For example, when an entity type is a person, a working professional decision tree might be traversed. As another example, when an entity type is media, a media tree (e.g., including videos, music, games, and/or a combination thereof) may be traversed. Further, any number of decision trees might be traversed to identify multiple entity names. For example, when an entity type is determined to be a person, a working professional decision tree might be traversed along with a social network decision tree that includes social networking features that may be used to distinguish between individuals.

Determining an entity type of an entity may be performed in any manner including, for instance, looking up predetermined entity type associations, using a rule or algorithm to identify an entity type, or the like. As can be appreciated, determining an entity type may occur at any time including at the time of receiving a search query for which an entity name is desired to be presented as a related search.

A decision tree can be traversed in any manner. For instance, a decision tree might be traversed in a same pattern each time, such as from a top level down. In another example, a decision tree might be traversed in various patterns depending on, for instance, a result of a particular feature. For example, a decision tree may be traversed in a different manner when both individuals are determined to be engineers than when both individuals are determined to be doctors.

Decision trees can be generated in any number of ways. In one example, a decision tree can be generated upon selecting features deemed prominent and/or as having differentiating power. By way of example only, using offline tool mining, computed entropy of each feature can be used to determine an extent of differentiating power between entities. Generation of a decision tree might be dependent on a particular segment or entity type as entity types have different sets of features.

The descriptor basis utilizes descriptors to generate entity names. Generally, descriptors are words used to describe an entity. In operation, a set of one or more descriptors can be mined from query logs or documents determined to be associated with the entity. A query log, or portion thereof, and/or document can be determined to be associated with an entity in any number of ways. Identifying descriptors to utilize in generating entity names might be based on, for example, nearness of terms to an initial entity name, use of terms in metadata, use of terms in titles, subtitles, or image descriptions, frequency of term usage, or the like. For example, the term "musician" utilized frequently near an entity of "taj mahal" can be identified and used to create a readable entity name of "taj mahal musician."

The entity relation basis uses entity relationships to generate entity names. In this regard, to generate an entity name for an initial entity, a related entity might be added to the initial entity to supplement the initial entity. Related entities can be determined in any manner and at any time (e.g., predetermined or dynamically determined). For example, query logs or documents associated with an entity might be mined to identify related entities. Upon identifying a related entity, an initial entity name can be supplemented to include the related entity, or indication thereof, such that a more relevant search can be performed.

In some embodiments, the entity relation basis might be used when a well-known or famous entity is related to a less-known entity. By way of example only, assume that a well-known actor, John Doe, has a child, Jane Doe, that is not well known and that has very few web results associated with the child. In such a case, if a user enters a child's name, Jane Doe, into the search engine, an entity relationship between the child, Jane Doe, and the more infamous actor, John Doe, can be recognized. As such, an entity name can be generated that includes names of both John Doe and Jane Doe, such as, for instance, "John Doe and Jane Doe" or "Jane Doe and John Doe." As another example, the name of the company founded by an individual might be appended to the individual's name to generate an entity name that more uniquely identifies the individual and may enable more relevant search results.

In accordance with embodiments of the present invention, any number of techniques may be employed to generate entity names for an entity. For example, in some embodiments, each technique may be used to identify an entity name for the entity. In other embodiments, a subset of the possible techniques may be employed. A particular technique(s) to use may depend on, for example, a type of entity, whether an entity is a sub-entity, whether an entity is a head entity, whether an entity is a tail entity, whether an entity is not identified as a head entity, tail entity, or sub-entity, or the like. A head entity refers to an entity that is popular or is associated with many queries. A tail entity refers to an entity that is not associated with many queries. By way of example only, a head entity might be a celebrity like "Taj Mahal" the musician or "Tom Hanks" the actor, while a tail entity might be a working professional from like "John Doe" from ABC Corp. In some embodiments, a threshold may be used to identify whether an entity is a head entity or a tail entity. For example, an entity associated with at least a threshold number of queries may be identified as a head entity, while an entity not associated with a threshold number of queries may be identified as a tail entity. As can be appreciated, separate threshold values may exist to identity head entities and tail entities. Further, such a threshold value may be associated with attributes other than number of queries, such as, for example, search results, selected search results, etc.

By way of example only, when an entity is determined to be a head entity, the query log basis may be selected for application to generate a query name. As another example, when an entity is determined to be associated with a query pattern (e.g., via a query log analysis) but does not have a clear signal from a query log that it is significantly more common, a rule basis methodology may be employed to generate an entity name. When an entity is determined to be a tail entity, the decision tree basis may be selected for application to generate a query name. Entity relation basis might be selected for generating a query name when an entity is a sub entity of or associated with a popular entity. These are merely examples of possible technique selections and are not intended to limit embodiments of the present invention.

The entity name selecting component 224 is configured to select an entity name for an entity. In this regard, the entity name selecting component 224 may select an entity name, from among any number of generated entity names, that uniquely or unambiguously identifies the entity. In some cases, entity name scores might be used to identify or select an entity name for an entity. An entity name score indicates an extent of uniqueness of a particular entity name. Entity name scores can be calculated or determined using any method, calculation, formula, lookup index, etc. In embodiments, an entity name score is determined using, for instance, a technique used to determine the entity name. In some cases, entity name scores below or above a predetermined threshold are selected for an entity name. In other cases, a greatest entity name score can be selected.

By way of example only, and without limitation, an entity name might be generated using multiple techniques, some of which are described above. The entity name selecting component 324 may then combine the results and produce a single unique human-readable name for the entity. Criteria for selecting an entity name might be based on the priority of the utilized techniques and/or weighted voting. As can be appreciated, other factors may be used in selecting an entity name. For instance, in some cases, multiple unique or distinctive names may be identified, but other measures such as length of the name, ease of speaking the name, avoidance of innuendo, secondary meaning, acronyms, slang, or the like might be factored into selecting an entity name.

As can be appreciated, in some cases, only a single entity name is generated by the entity name generating component 222. In such cases, the generated name might be selected for an entity with or without utilizing any selection criteria. Further, in some implementations, the entity name selecting component 224 may be altogether avoided when only a single entity name is generated.

The providing component 226 is configured to provide entity names. Entity names can be provided to the user device 210, the search service 212, and/or the data store 216. As previously described, the user device 210 may present the entity name as a related search, or the like, or otherwise use the entity name (e.g., as a requery). In this regard, such data may be communicated to the user device for display to the user, via a display screen of the user device. By way of further example, entity names may be communicated to a search engine such that the search engine can incorporate the data into the search results page to be transmitted to the user device. Entity names may be alternatively or additionally provided to the data store 216 for storage and subsequent reference.

As can be appreciated, entity name generation may occur at any number of times. For example, in some implementations, entity names might be generated offline and stored in a data store, such as data store 216. In such an implementation, upon a search engine receiving a search query, one or more entity names can be referenced for presentation to the user (e.g., as a related search, etc.). In other implementations, entity names might be generated in real-time in accordance with an entered search query. In this regard, upon a search engine receiving a search query, one or more entity names can be generated for presentation to the user (e.g., as a related search, etc.).

Figure 3:
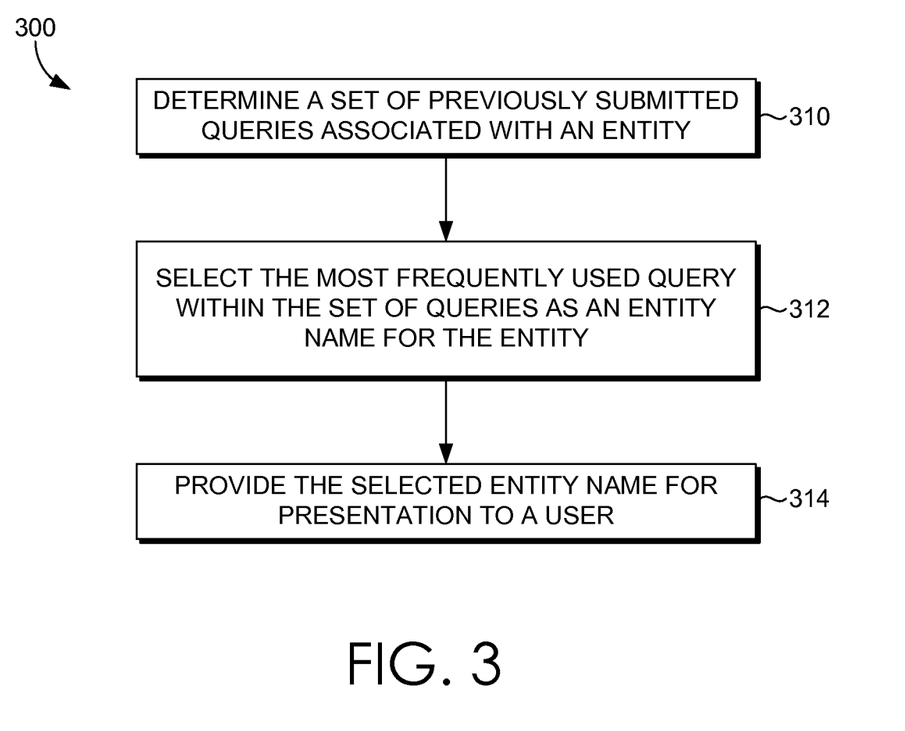
FIG. 3 is a flow diagram depicting a first illustrative method of facilitating generation of distinct entity names, according to embodiments of the invention.

To recapitulate, embodiments of the invention include systems, machines, media, methods, techniques, processes and options for generating distinct or unique entity names to facilitate entity disambiguation. Such entity names can be displayed in association with a corresponding query input by a user. Turning to FIG. 3, a flow diagram is illustrated that shows an exemplary method 300 for generating distinct entity names, according to embodiments of the present invention. In some embodiments, aspects of embodiments of the illustrative method 300 can be stored on computer-readable media as computer-executable instructions, which are executed by a processor in a computing device, thereby causing the computing device to implement aspects of the method 300. The same is of course true with the illustrative methods 400 and 500 depicted in FIGS. 4 and 5, respectively, or any other embodiment, variation, or combination of these methods.

Initially, at block 310, a set of previously submitted queries associated with an entity is determined. Queries may be determined to be associated with an entity based on search results, URLs, or web documents associated with the queries being determined as relevant to the entity. At block 312, the most frequently used query within the set of previously submitted queries is selected as an entity name for the entity. At block 314, the selected entity name is provided for presentation to a user. The entity name can be used to represent an entity as a requery on a search results page. For example, the entity name can be presented as a suggested search on a search results page.

Figure 4:
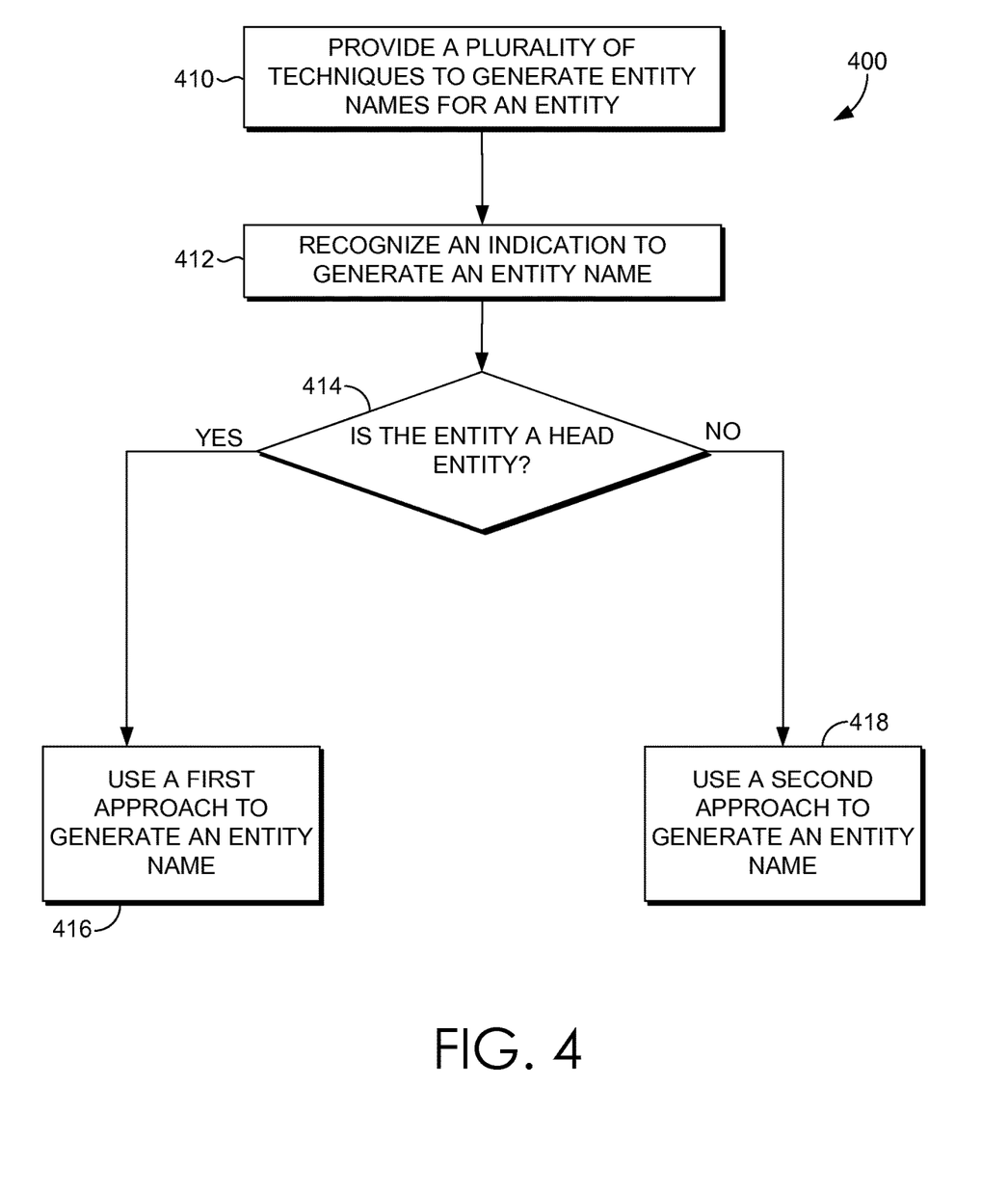
FIG. 4 is a flow diagram depicting a second illustrative method of facilitating generation of distinct entity names, in accordance with embodiments of the invention.

Turning now to FIG. 4, a flow chart depicts an illustrative method 400 of generating distinct entity names. Initially, at block 410, a plurality of techniques to generate entity names for entities are provided. At block 412, an indication to generate an entity name is recognized. In some cases, such an indication might be recognized in accordance with a user-entered query. At block 414, it is determined whether the entity is a head entity associated with numerous queries or a tail entity associated with a limited number of queries. In embodiments, making such a determination may be based on analysis of a query log. If an entity is determined to be a head entity, using a first approach to generate an entity name, as indicated at block 416. Such a first approach may be, for example, a query log basis or decision tree basis. On the other hand, if an entity is determined to be a tail entity, using a second approach to generate an entity name, as indicated at block 418. Such a second approach may be, for example, a decision tree basis or query log basis. In this regard, both head entities and tail entities can have human-readable entity names that are unambiguous.

Figure 5:
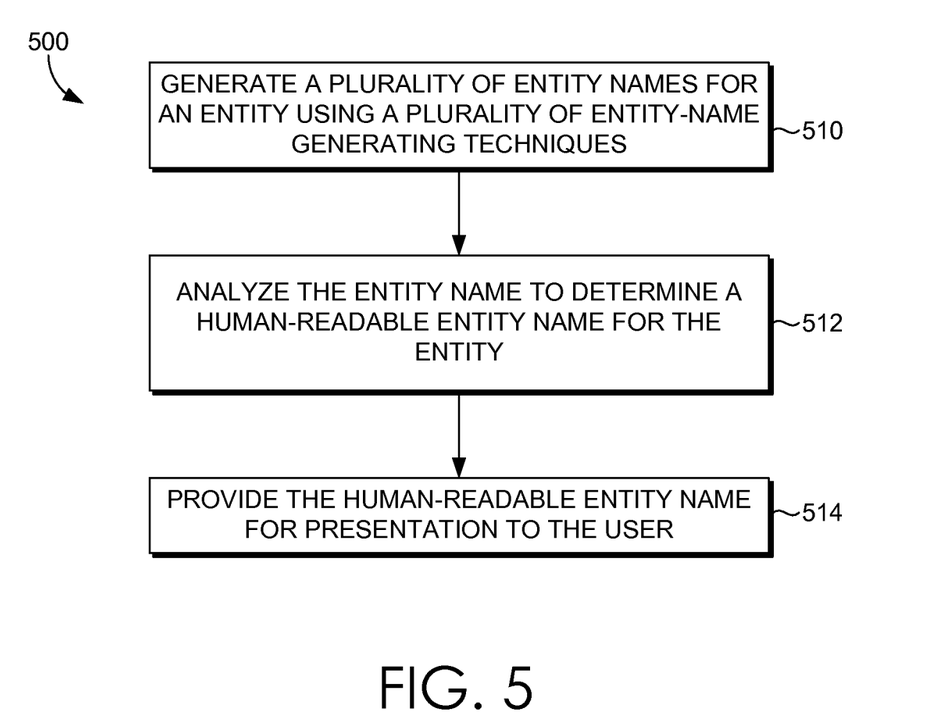
FIG. 5 is a flow diagram depicting a third illustrative method of facilitating generation of distinct entity names according to embodiments of the invention.

With reference to FIG. 5, another flow chart depicts an illustrative method 500 of generating distinct entity names. With initial reference to block 510, a plurality of entity names for an entity are generated using a plurality of entity-name generating techniques. At block 512, the plurality of entity names are analyzed to determine a human-readable entity name for the entity. The human-readable entity name may be determined based on priority of entity-name generating techniques, weights associated with entity-name generating techniques, entity name scores determined for each of the entity names, or the like. At block 514, the human-readable entity name is provided for presentation to a user, for example, as a related search suggestion.

Various embodiments of the invention have been described to be illustrative rather than restrictive. Alternative embodiments will become apparent from time to time without departing from the scope of embodiments of the inventions. It will be understood that certain features and sub-combinations are of utility and may be employed without reference to other features and sub-combinations. This is contemplated by and is within the scope of the claims.

The invention claimed is:

1. One or more computer-readable storage media having embodied thereon computer-executable instructions that, when executed by a processor in a computing device, cause the computing device to perform a method of improving a search results graphical interface by facilitating generation of entity names that distinctly identify entities associated with search results, the method comprising:
   obtaining a search result for presentation to a user in response to a user query, wherein the search result is associated with an entity;
   generating a plurality of human-readable candidate entity names for the entity using a plurality of entity-name generating techniques;
   determining entity name scores for the candidate entity names, wherein the entity name scores indicate an extent of uniqueness of corresponding candidate entity names, and wherein an entity name score is determined based at least in part on the entity-name generating technique used to generate a respective candidate entity name;
   selecting a most distinct entity name for the entity from among the plurality of candidate entity names, wherein the selection is based at least in part on the entity-name scores; and
   causing the selected entity name to be presented with the search result via a search results page to unambiguously represent the entity associated with the search result.

2. The media of claim 1, wherein the plurality of entity-name generating techniques comprises at least a query log basis that utilizes frequently used query terms associated with the entity to generate the entity name.

3. The media of claim 1, wherein the plurality of entity-name generating techniques comprises at least a decision tree basis that traverses a decision tree to generate the entity name.

4. The media of claim 1, wherein the plurality of entity-name generating techniques comprises a rule basis that uses one or more rules to generate the entity name for the entity based on a type of entity.

5. The media of claim 1, wherein the plurality of entity-name generating techniques comprises an entity relation basis that uses relationships between entities to generate the entity name for the entity.

6. The media of claim 1, wherein the selection of the most distinct entity name for the entity uses prioritization of the entity-name generating techniques based on a type of entity.

7. The media of claim 6, wherein the type of entity comprises a head entity, a tail entity, or a sub-entity.

8. A method of improving a search results graphical interface by facilitating generation of entity names that distinctly identify entities associated with search results, the method comprising:
   obtaining a search result for presentation to a user in response to a user query, wherein the search result is associated with an entity;
   generating a plurality of human-readable candidate entity names for the entity using a plurality of entity-name generating techniques;
   determining entity name scores for the candidate entity names, wherein the entity name scores indicate an extent of uniqueness of corresponding candidate entity names, and wherein an entity name score is determined based at least in part on the entity-name generating technique used to generate a respective candidate entity name;
   selecting a most distinct entity name for the entity from among the plurality of candidate entity names, wherein the selection is based at least in part on the entity-name scores; and
   causing the selected entity name to be presented with the search result via a search results page to unambiguously represent the entity associated with the search result.

9. The method of claim 8, wherein the plurality of entity-name generating techniques comprises at least a query log basis that utilizes frequently used query terms associated with the entity to generate the entity name.

10. The method of claim 8, wherein the plurality of entity-name generating techniques comprises at least a decision tree basis that traverses a decision tree to generate the entity name.

11. The method of claim 8, wherein the plurality of entity-name generating techniques comprises a rule basis that uses one or more rules to generate the entity name for the entity based on a type of entity.

12. The method of claim 8, wherein the plurality of entity-name generating techniques comprises an entity relation basis that uses relationships between entities to generate the entity name for the entity.

13. The method of claim 8, wherein the selection of the most distinct entity name for the entity uses prioritization of the entity-name generating techniques based on a type of entity.

14. The method of claim 13, wherein the type of entity comprises a head entity, a tail entity, or a sub-entity.

15. A system for providing an improved search results graphical interface by facilitating generation of entity names that distinctly identify entities associated with search results, the system comprising:
   one or more processors;
   one or more computer-readable storage media having embodied thereon computer-executable instructions which, when executed by the one or more processors, cause the one or more processors to:
   obtain a search result for presentation to a user in response to a user query, wherein the search result is associated with an entity;
   generate a plurality of human-readable candidate entity names for the entity using a plurality of entity-name generating techniques;
   determine entity name scores for the candidate entity names, wherein the entity name scores indicate an extent of uniqueness of corresponding candidate entity names, and wherein an entity name score is determined based at least in part on the entity-name generating technique used to generate a respective candidate entity name;
   select a most distinct entity name for the entity from among the plurality of candidate entity names, wherein the selection is based at least in part on the entity-name scores; and
   cause the selected entity name to be presented with the search result via a search results page to unambiguously represent the entity associated with the search result.

16. The system of claim 15, wherein the plurality of entity-name generating techniques comprises at least a query log basis that utilizes frequently used query terms associated with the entity to generate the entity name.

17. The system of claim 15, wherein the plurality of entity-name generating techniques comprises at least a decision tree basis that traverses a decision tree to generate the entity name.

18. The system of claim 15, wherein the plurality of entity-name generating techniques comprises a rule basis that uses one or more rules to generate the entity name for the entity based on a type of entity.

19. The system of claim 15, wherein the plurality of entity-name generating techniques comprises an entity relation basis that uses relationships between entities to generate the entity name for the entity.

20. The system of claim 15, wherein the selection of the most distinct entity name for the entity uses prioritization of the entity-name generating techniques based on a type of entity.

* * * * *